United States Patent Office 3,278,078
Patented Oct. 11, 1966

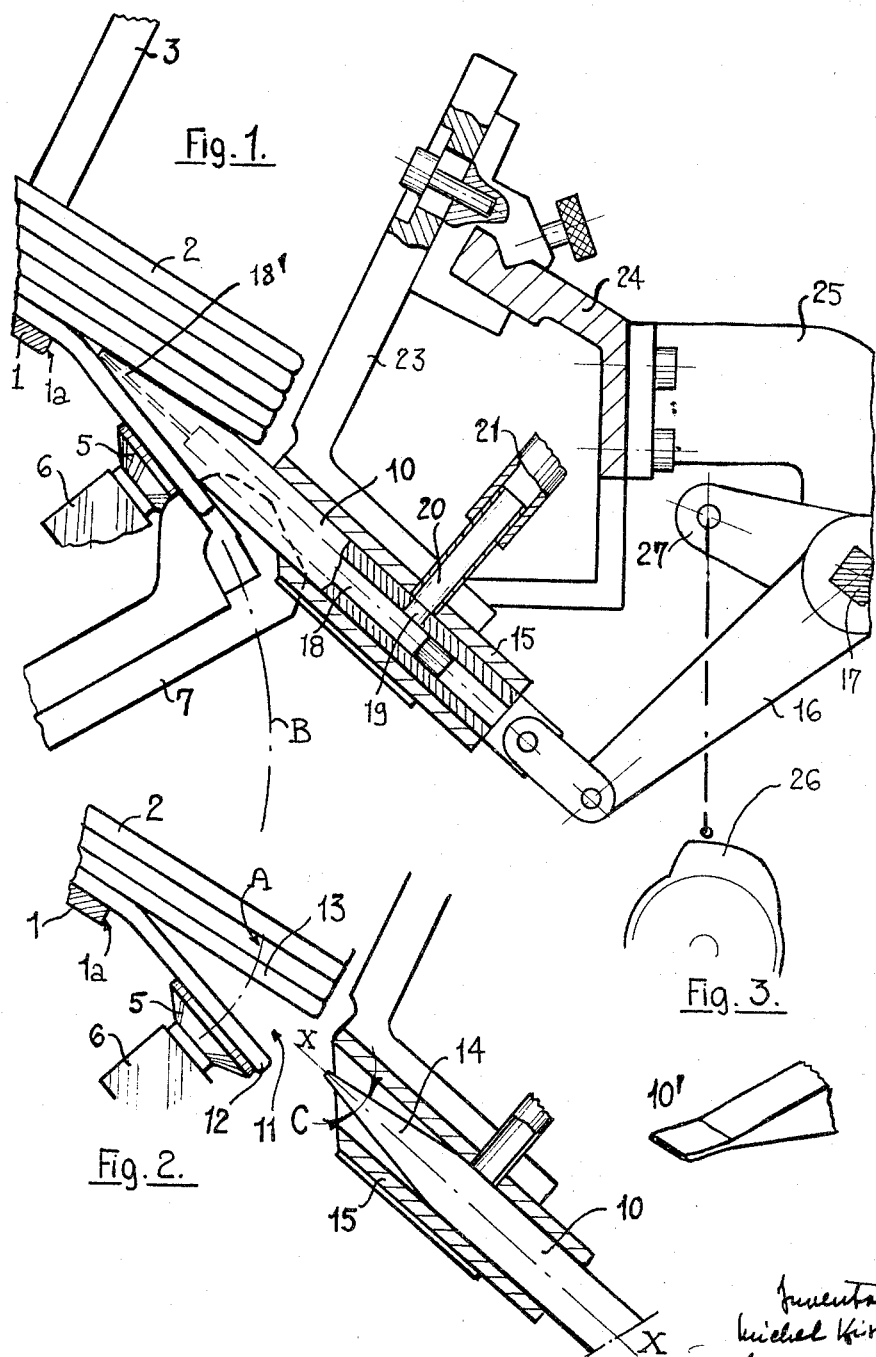

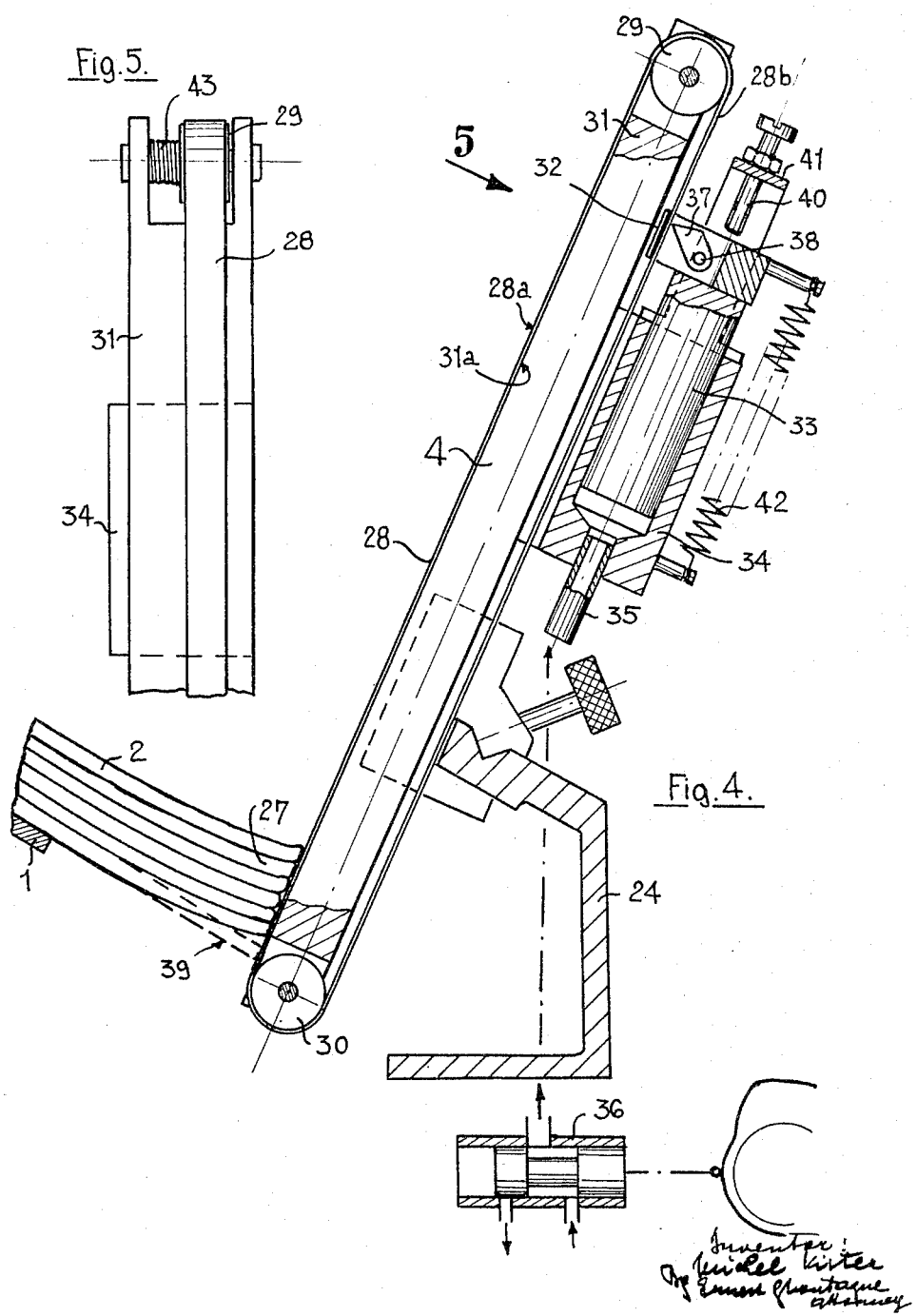

3,278,078
DEVICE FOR DISPENSING DOCUMENTS SINGLY
Michel Kister, Petit-Lancy, Geneva, Switzerland, assignor to Ertma S.A., Geneva, Switzerland
Filed Sept. 30, 1965, Ser. No. 491,755
Claims priority, application Switzerland, Oct. 2, 1964, 12,820/64
7 Claims. (Cl. 221—36)

The present invention relates to a device for dispensing singly documents arranged in a stack in a magazine, comprising an extraction mechanism having a moving suction member actuated so as to grip the end part of the first document in the stack and then to bend this part so as to bring it within reach of extraction means which withdraw the document from the magazine.

This device is characterized in that it comprises a movable member producing an air jet arranged opposite the free space which is formed between the bent part of the first document and the second document, and drive means which give this member an alternating movement and cause it to penetrate into the said gap, its front end being inserted between contiguous parts of the two documents so that air can be blown between these parts when the first document is extracted.

In a preferred form of embodiment, the magazine comprises a guide against which the stacked documents abut along their edges which are to be bent, this guide comprising an endless feed member against which the documents rest, and the device comprises a drive mechanism which advances this member such that the documents moving in the magazine are kept flat.

The drawings show by way of example one form of embodiment of the device according to the invention.

FIGURE 1 is a partial view in elevation of this device and shows a first mechanism;

FIGURE 2 is a partial view of the mechanism shown in FIGURE 1 in another position;

FIGURE 3 is a perspective view of a modification of a part of the device;

FIGURE 4 is a partial view of the device in elevation and shows a second mechanism; and FIGURE 5 is a partial view of the second mechanism along the arrow 4—4 of FIGURE 3.

The device illustrated is intended to successively dispense documents stacked in a magazine. These documents will mostly be relatively thick paper books or pamphlets. They may, however, also be folders, all types of cards or envelopes, or even single sheets.

The magazine for the stack of documents comprises a baseplate 1 on which said stack 2 rests and guides such as those shown at 3 and 4 (FIGURES 1 and 3) which enclose the stack.

The baseplate 1 does not cover all of the magazine base and the device comprises an extraction mechanism adapted to grip the lower part of the document between the edge 1a of the plate 1 and the front guides 4 and to bend this part so as to bring it within the reach of extraction means which withdraw the document from the magazine.

The extraction mechanism comprises rubber suction pads 5 which are arranged on a moving support element 6 which is alternated in the direction shown at A and which alternately applies the suction pads against the lower document lying flat on the base plate 1 and moves them into the angular position shown in FIGURE 2.

The extraction mechanism comprises jaws such as those illustrated at 7 which are alternated in the direction shown by B and which grip the bent part of the lower document and withdraw said document from the magazine (FIGURE 1).

The extraction mechanism also comprises an air finger 10 arranged opposite the free gap 11 which forms between the bent part 12 of the first document and the second document 13 (FIGURE 2).

This finger 10 has a wedge-shaped front end 14 and is adapted to move in a sleeve 15 along the line X—X, which is the bisector of the angle of the apex C of the wedge (FIGURE 2).

An arm 16 fixed onto a shaft 17 reciprocates the member 10 between the two extreme positions shown in FIGURES 1 and 2 respectively.

In the withdrawn position shown in FIGURE 2, the front end of the finger 10 is not within reach of the documents, whilst in the advanced position shown in FIGURE 1 it comes between adjacent parts of the first and second documents.

An axial conduit 18 passes through the finger 10 and opens out at 18' at the front end of said finger, communicating at the rear end thereof with a hole 19 in the upper wall of the finger. The sleeve 15 has a connection 20 to which a supply of compressed air is connected by means of a flexible pipe 21. With the finger in the advanced position, the hole 19 is opposite the connection 20 and compressed air is thus blown between the first two documents. A cushion of air is thus produced between these documents, separating them and facilitating the withdrawal of the lower document.

Due to the displacement of the hole 19, the supply of compressed air is cut off shortly after the finger 10 begins to withdraw, which happens when the lower document is withdrawn from the magazine.

The sleeve 15 is secured to a support 23 mounted adjustably on a cross-member 24, from which the shaft 17 is suspended by means of brackets 25. A cam shown diagrammatically at 26 actuates the shaft 17 by means of a system of rods connected to the arm 27, which is also fixed to the shaft 17. The cam 26 operates synchronously with other cams (not shown) which actuate the suction-pad supports 6 and the extraction jaws 7.

There is generally one finger 10, but if the magazine is very wide two may be provided.

As shown in FIGURE 3, the finger 10 may be modified so that it comprises at its front end a thinner nozzle 10', an appreciable length of which penetrates between the documents.

The air blown between the documents makes it easy to withdraw the bottom one regardless of the weight of the stack. The air cushion thus formed more especially prevents the lower sheet of the following document from sticking to the first and being pulled out with it.

Because of the flexibility of the suction pads and the variations in the stiffnes of the documents, the bent part of the lower document does not always take up the same position. Th finger 10 therefore also has the advantage of providing a supporting surface which brings this bent part of the document into its exact position and thus ensures that it passes between the extraction jaws 7.

As the documents are withdrawn from the base of the magazine, the stack moves down between the guides supported by the inclined front guides 4, and to prevent the documents being bent as shown at 27 in FIGURE 4, each front guide 4 is in the form of an endless feed member against which the documents bear. This feed member consists of an endless rubber belt 28 stretched over two pulleys 29 and 30 arranged at the two ends of the guide body 31. The front run 28a of the belt bears against the front face 31a of the guide body, whilst the rear run 28b passes through a stirrup member 32 arranged at the upper end of a piston 33 in a cylinder 34 fast with the guide body 31. Compressed air is supplied to the cylinder 34 through a conduit 35, which conduit is fitted with a three-way valve, which is shown diagrammatically at 36 and controlled by a cam actuated synchronously with the cams already referred to which control the other operations.

When the lower document is withdrawn, the air introduced into the cylinder 34 lifts the piston 33 which, by means of a pawl 37 pivoted at 38 in the stirrup member 32, moves with it the belt 28. This upward movement of the rear run corresponds to a downward movement of the front run 28a and the adjacent edges of the documents are therefore lowered, the lower document of the stack being brought into the desired horizontal position shown at 39 in FIGURE 3.

The stroke of the piston 33 is fixed by an adjustable stop 40 mounted on the stirrup member 41 fixed to the cylinder 34. When the pressure in the cylinder drops, the piston 33 is returned to its lower position by a spring 42 and the stirrup member 32 slides over the rear run 28b of the ribbon, since the pawl 37 is now free. A spring 43 arranged between the upper pulley 29 and the adjacent flange of the body 31 prevents any recoil of the belt 28.

The travel of the belt 28, fixed by the setting of the screw 40, is adjusted so that the lower document of the stack is always brought into the horizontal position.

In one modified embodiment, the cylinder 34 is not actuated each time a document is extracted, but after longer intervals, for example corresponding to the total travel of the piston in the cylinder.

The movement of the guides 4 ensures steady working of the dispensing mechanism, even when the flexibility of the documents varies considerably.

I claim:

1. A device for dispensing documents singly from a stack, comprising a magazine to receive a stack of documents; suction means mounted adjacent said magazine; a supporting element for said suction means movable to apply said suction means to grip an end part of a first document in the stack and to bend said end part away from a second document in the stack; extraction means to grip said first document and withdraw it from said magazine; a movable insertion member producing an air jet arranged opposite the free space formed between said bent end part of said first document and said second document; and drive means coupled to said insertion member to impart to said insertion member a reciprocating movement whereby said member is caused to penetrate into said gap in an advanced position, its front end being inserted between contacting parts of said first and second documents so that air can be blown between such parts when said first document is extracted.

2. A device according to claim 1, in which said insertion member has a surface which holds said end part of said first document in a given angular position.

3. A device according to claim 2, in which said insertion member comprises a finger having a wedge-shaped front end and movable by said drive means in the direction of a line bisecting the apex angle of such wedge.

4. A device according to claim 2, in which said insertion member comprises a finger having a passage and communicating apertures therein, said dispensing device including an apertured guide sleeve for said finger, air being supplied to said finger only when the apertures in said finger and said sleeve are superposed and said apertures being superposed only when said finger is in its advanced position.

5. A device according to claim 1, in which said magazine has a guide comprising an endless feed member against which the stacked documents rest along the free edges of their end parts which are to be bent, and said device includes a drive mechanism to advance said feed member whereby the documents in the magazine are kept flat.

6. A device according to claim 5, in which said drive mechanism comprises a pneumatic motor, a reciprocating member driven by said pneumatic motor and connection means through which said endless feed member is driven by said reciprocating member only in one direction.

7. A device according to claim 5, in which said magazine comprises a baseplate for the stack of documents, said guide being mounted perpendicular to said baseplate and mounted at a distance from an edge thereof, and said baseplate and guide being inclined so that the documents thereon bear against said endless feed member.

References Cited by the Examiner

UNITED STATES PATENTS

| Re. 22,434 | 2/1944 | Allen | 221—210 X |
| 2,011,464 | 8/1935 | Winkler et al. | 271—32 |
| 2,012,681 | 8/1935 | Howard | 221—225 |
| 2,564,417 | 8/1951 | Baker et al. | 271—32 |
| 2,722,416 | 11/1955 | Backhouse | 271—26 |
| 2,734,657 | 2/1956 | Drese | 221—251 |
| 2,956,804 | 10/1960 | Ridenour | 271—32 |
| 3,091,362 | 5/1963 | Robinson | 221—278 X |

FOREIGN PATENTS

| 55,462 | 3/1911 | Switzerland. |

SAMUEL F. COLEMAN, *Primary Examiner.*